United States Patent [19]

Murata et al.

[11] 4,273,900

[45] Jun. 16, 1981

[54] DIAPHRAGM FOR ACOUSTIC EQUIPMENT

[75] Inventors: Kosaku Murata, Kobe; Satoshi Takayama, Moriguchi; Mitsuru Ieki, Kyoto, all of Japan

[73] Assignee: Matsushita Electric Industrial Co., Ltd., Osaka, Japan

[21] Appl. No.: 55,780

[22] Filed: Jul. 9, 1979

Related U.S. Application Data

[63] Continuation of Ser. No. 903,798, May 8, 1978, abandoned.

[30] Foreign Application Priority Data

May 7, 1977 [JP] Japan .................................. 52/262

[51] Int. Cl.$^3$ ............................................. C08L 67/02
[52] U.S. Cl. .................................... 525/444; 428/480
[58] Field of Search ................. 525/444; 428/480, 483

[56] References Cited

U.S. PATENT DOCUMENTS

| | | | |
|---|---|---|---|
| 3,674,109 | 7/1972 | Murase | 428/310 |
| 3,963,800 | 6/1976 | Gipp et al. | 260/860 |
| 4,004,960 | 1/1977 | Crowell | 428/480 |
| 4,059,715 | 11/1977 | Fletcher | 260/860 |
| 4,064,098 | 11/1977 | Saitoh et al. | 260/860 |

*Primary Examiner*—William J. Van Balen
*Attorney, Agent, or Firm*—Stevens, Davis, Miller & Mosher

[57] ABSTRACT

A diaphragm for acoustic equipment molded from a composition mainly consisting of a polyester-polyether block copolymer prepared by condensing a polytetramethylene-terephthalate with a poly(tetramethyleneoxide)glycol or any other polyester-polyether block copolymer. This diaphragm for acoustic equipment has an excellent low-pitched sound reproducing performance and flat acoustic pressure-frequency characteristics.

4 Claims, 1 Drawing Figure

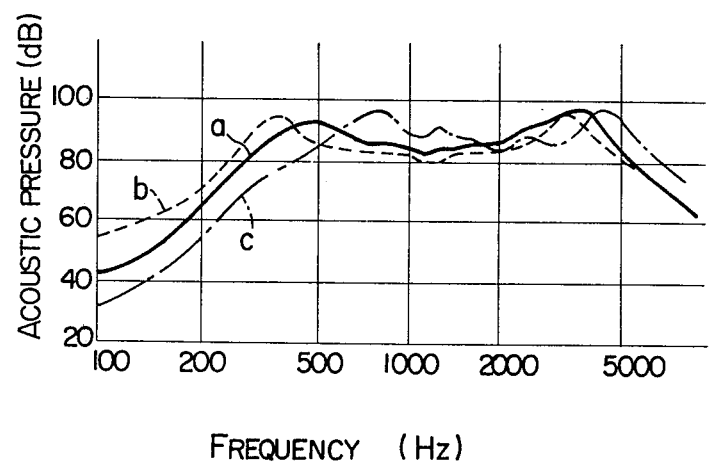
F I G.

DIAPHRAGM FOR ACOUSTIC EQUIPMENT

This is a continuation of U.S. Pat. application Ser. No. 903,798 filed May 8, 1978, now abandoned.

BRIEF SUMMARY OF THE INVENTION

The present invention relates to a diaphragm for acoustic equipment having excellent low-pitched sound reproducing performance and flat acoustic pressure-frequency characteristics.

Conventional speaker-diaphragms are usually made from a cone shaped paper. Organic plastic film diaphragms such as polyethyleneterephthalate films have also been used for the same purpose.

Among these prior art diaphragm materials, polyethyleneterephthalate, Mylar (tradename) and Lumilar are mainly used in small diameter speakers, for example, in tweeters, in speakers for a small-sized radio receivers, and in speakers for headphones. However, since plastic film diaphragms have a higher elasticity and a small inner loss, strain might develop during sound reproduction.

Thus, in general, the lowest resonant frequency $f_o$ of speaker is given by the following equation:

$$f_o = \frac{1}{2\pi}\sqrt{\frac{S_o}{m_o}}$$

(wherein $S_o$ is the stiffness in the diaphragm supporting portion, and $m_o$ is the effective mass of the vibration system).

Since the conventional polyethyleneterephthalate film has a large elastic modulus, diaphragms made of such film have a high $S_o$ and hence, as apparent from the above equation, also a high $f_o$, usually about 600 Hz, making it difficult for them to reproduce low-pitched sounds. If $S_o$ is lessened by reducing the film thickness to improve the low-pitched sound reproducing characteristics of the polyethyleneterephthalate film diaphragm, divisional resonance is produced in the diaphragm causing strains to develop during reproduction. It was thus difficult to improve the acoustic characteristics of plastic film diaphragms.

The present inventors have conducted further studies to improve the properties, particularly acoustic characteristics, of the conventional types of speaker diaphragms, particularly those made of plastic film, and have succeeded in developing a diaphragm prepared from a polyester-polyether block copolymer for acoustic equipment having quite satisfactory properties.

An object of the present invention is to provide a diaphragm for acoustic equipment having an excellent low-pitched sound reproducing performance and flat acoustic pressure-frequency characteristics.

BRIEF DESCRIPTION OF THE DRAWING

The sole FIGURE illustrates pressure-frequency characteristics of diaphragms of the prior art and those of the present invention.

DETAILED DESCRIPTION

According to the present invention, there is provided a diaphragm for acoustic equipment that is prepared from polyester-polyether block copolymer mainly consisting of polytetramethyleneterephthalate having a rigidity as the hard segment of the diaphragm and poly(tetramethyleneoxide)glycol having rubber-like elasticity as the soft segment of the diaphragm. The feature of said block copolymer is that the elasticity of the copolymer can easily be controlled by adjusting the amount of poly(tetramethyleneoxide)glycol as the soft segment in the block copolymer.

As the result, according to the present invention, various types of acoustic equipment, such as speakers, can be freely designed and thus various types of requirements in designing the acoustic equipment can be successfully fulfilled.

Since the inner loss of the present diaphragm is within the range of 0.04 to 0.20, which is large as compared with that 0.007 of conventional polyethyleneterephthalate film (for example, Mylar film), the present diaphragm provides a better acoustic reproducing performance.

The accompanying FIGURE is the acoustic pressure-frequency characteristic of speaker diaphragms. Curves (a) and (b) indicate the characteristics of the diaphragms according to the present invention and curve (c) indicates the characteristic of a conventional speaker diaphragm.

Furthermore, drawbacks encountered in the prior art in manufacturing acoustic diaphragms prepared from polyethyleneterephthalate can not be seen in case of manufacturing diaphragms using the block copolymer of the present invention.

Thus, in molding to make a polyethyleneterephthalate diaphragm, the polyethyleneterephthalate film is pressed under heating in a die to form the predetermined shape, and the molded product is removed from the die which is at once cooled to facilitate the removal of the product. If the molded product is removed from the die without cooling the die, then the molded product would be deformed resulting in an undesirable shape, so that it is difficult to obtain a product having predetermined shape. Moreover, it requires a much longer period of time to run the molding operation.

On the contrary, the diaphragm of block copolymer of the present invention can be molded under vacuum in a pressurized condition, so that the productivity of manufacturing the diaphragm is greatly increased.

Generally, there are some problems such as poor adhesiveness between the diaphragm and a voice coil or between the diaphragm and a frame rises which are troublesome when the diaphragm is made of a conventional polymer material. In the present invention, however, such problems can be solved by surface-treating the block copolymer film. Various types of techniques for treating the surface of plastic film are known in the art. In one method of surface-treating the plastic film, the present block copolymer film is subjected to a corona-discharge treatment and just after the treatment, a synthetic rubber type adhesive material, such as chloroprene or neoprene, is coated on the surface of the film treated by corona discharge, and then the block copolymer film coated with the adhesive is effectively subjected to a molding operation for making a diaphragm of predetermined shape for a desired acoustic equipment such as a speaker. According to a peel test of the diaphragm (for example, aluminium to chloroprene peel test at 180° peeling), a sufficient adhesion strength between the copolymer film and aluminium was obtained due to a plastic deformation occurring in the block copolymer.

The present invention will be illustrated in further detail by way of the following examples.

EXAMPLE 1

Block copolymer pellets consisting of poly(tetramethyleneoxide)glycol having molecular weight of 1000 as the soft segment and polytetramethyleneterephthalate as the hard segment, said copolymer having the mole ratio of [terephthalic acid part]:[poly(tetramethyleneoxide)glycol]=7:1 and also containing 0.3 part of 2-hydroxy-4-n-octoxy benzophenone as a ultraviolet absorber per 100 parts of the copolymer, were dried at 110° C. for 24 hours and then extruded by using a screw extruder having a diameter of 25 mm at 240° C. with T-die of 300 mm×0.6 mm, and cooled on chill roll at 50° C. The block copolymer film thus made was subjected to a corona-discharge at 110 KHz and at 4 K volts. Then the corona-discharged surface of the film was coated with an adhesive mainly consisting of chloroprene to form an adhesive layer having a thickness of 1 to 1.4 $\mu$m. The treated copolymer film has a size of 100 mm in width and 70$\mu$ in thickness. Elasticity modulus of this film was 1700 kg/cm$^2$ and inner loss was 0.15. A predetermined shaped diaphragm was made by using a vacuum press die. Small-sized speakers for headphones were made from this diaphragm having a 40 mm diameter with a 125 $\Omega$ impedance.

EXAMPLE 2

A block copolymer film was prepared by the method similar to that described in Example 1, but instead a block copolymer was used consisting of poly(tetramethyleneoxide)glycol having a molecular weight of 1000 as the soft segment and polytetramethyleneterephthalate as the hard segment, said copolymer having the mole ratio of [terephthalic acid part]:[poly(tetramethyleneoxide)glycol]=10:1.

Elasticity modulus of this block copolymer film was 1200 kg/cm$^2$ and inner loss was 0.17.

The adhesion strengths between diaphragm and voice coil and between diaphragm and frame of the diaphragms obtained in Examples 1 and 2 were excellent and no troubles were observed in actual use. Additionally, according to weathering evaluation test conducted by using a weatherometer, if an ultraviolet absorber is added to the present diaphragm a durability 1.5 times longer than that of a diaphragm without the ultraviolet absorber is attained. Furthermore no changes in the acoustic characteristics were observed in the diaphragm containing the ultraviolet absorber after the weathering evaluation test.

In the accompanying FIGURE, curves (a) and (b) indicate the acoustic pressure-frequency characteristics of the speakers respectively made of the diaphragms prepared and shaped from the block copolymer film obtained in Examples 1 and 2. Curve (c) indicates the acoustic pressure-frequency characteristics of the speaker made of a diaphragm of conventional polyethyleneterephthalate film molded in the same shape having 70$\mu$ in thickness. As apparent from the FIGURE, the speakers using the diaphragms of the present invention show excellent low-pitched sound reproducing performance.

The lowest resonant frequency $f_o$ of the speaker made of diaphragm of conventional polyethyleneterephthalate film is 780 Hz, while the lowest resonant frequency $f_o$ of the speakers made of diaphragms obtained in Examples 1 and 2 of the present invention are respectively 480 Hz and 350 Hz, which show flat acoustic pressure-frequency characteristics, particularly, at the middle region of the frequency scale.

What is claimed is:

1. A diaphragm for a sound transducing device having a lowest resonant frequency lower than or equal to 480 Hz and an inner loss between 0.04 and 0.20 which is prepared by molding a composition mainly consisting of a copolymer of poly (tetramethyleneoxide) glycol with polytetramethyleneterephthalate.

2. A diaphragm as in claim 1, wherein the molar ratio of terephthalic acid moiety to poly (tetramethyleneoxide) glycol is in the range of about 10:1 to about 7:1.

3. A diaphragm as in claim 2, wherein said ratio is 10:1.

4. A diaphragm as in claim 2, wherein said ratio is 7:1.

* * * * *